Nov. 2, 1948.  M. K. GOLDSTEIN  2,452,564
DIRECTION FINDER
Filed May 15, 1945  2 Sheets-Sheet 1
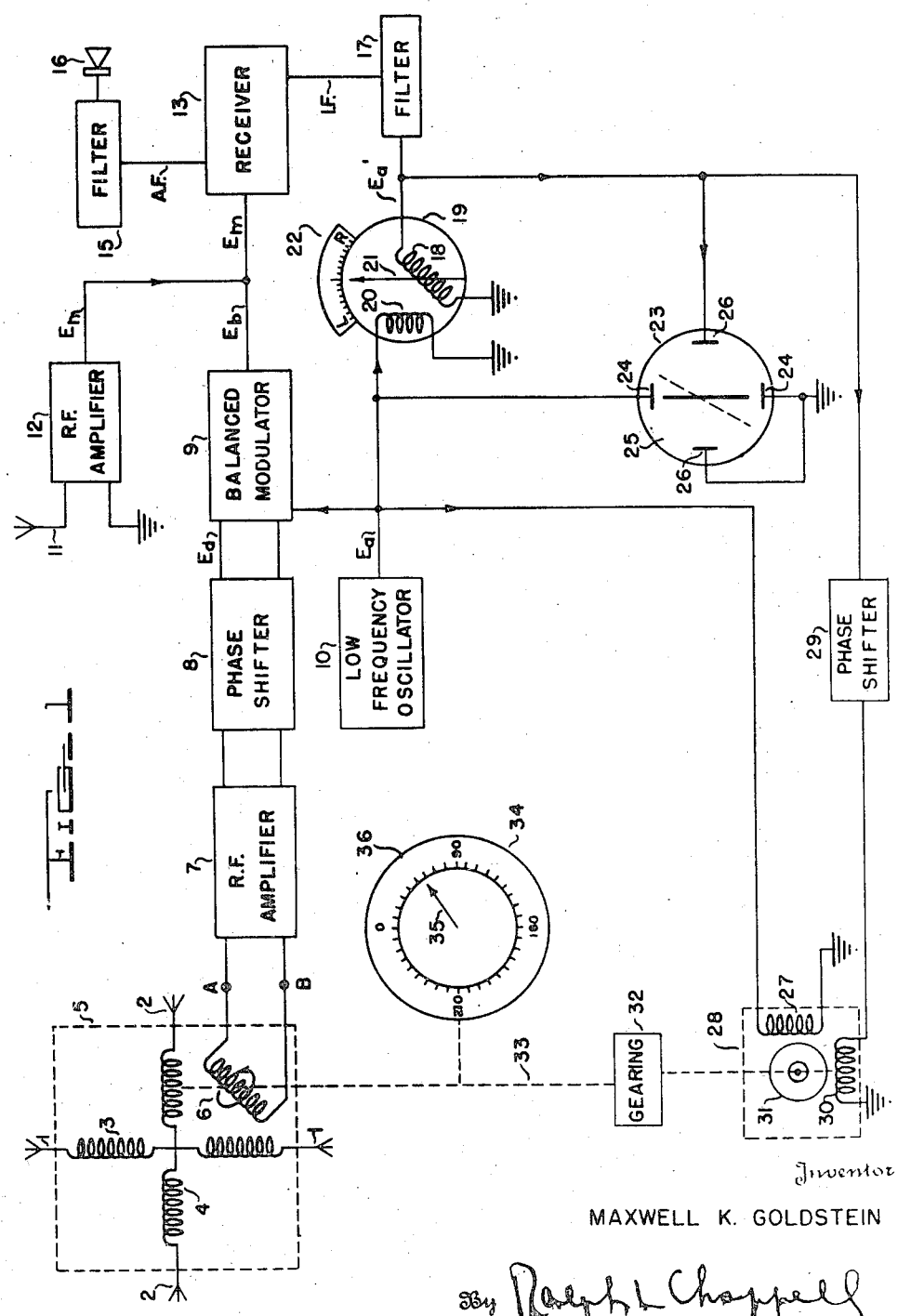
Inventor
MAXWELL K. GOLDSTEIN
By Ralph L. Chappell
Attorney Nov. 2, 1948.　　　　M. K. GOLDSTEIN　　　　2,452,564
DIRECTION FINDER
Filed May 15, 1945　　　　　　　　　　　　2 Sheets-Sheet 2
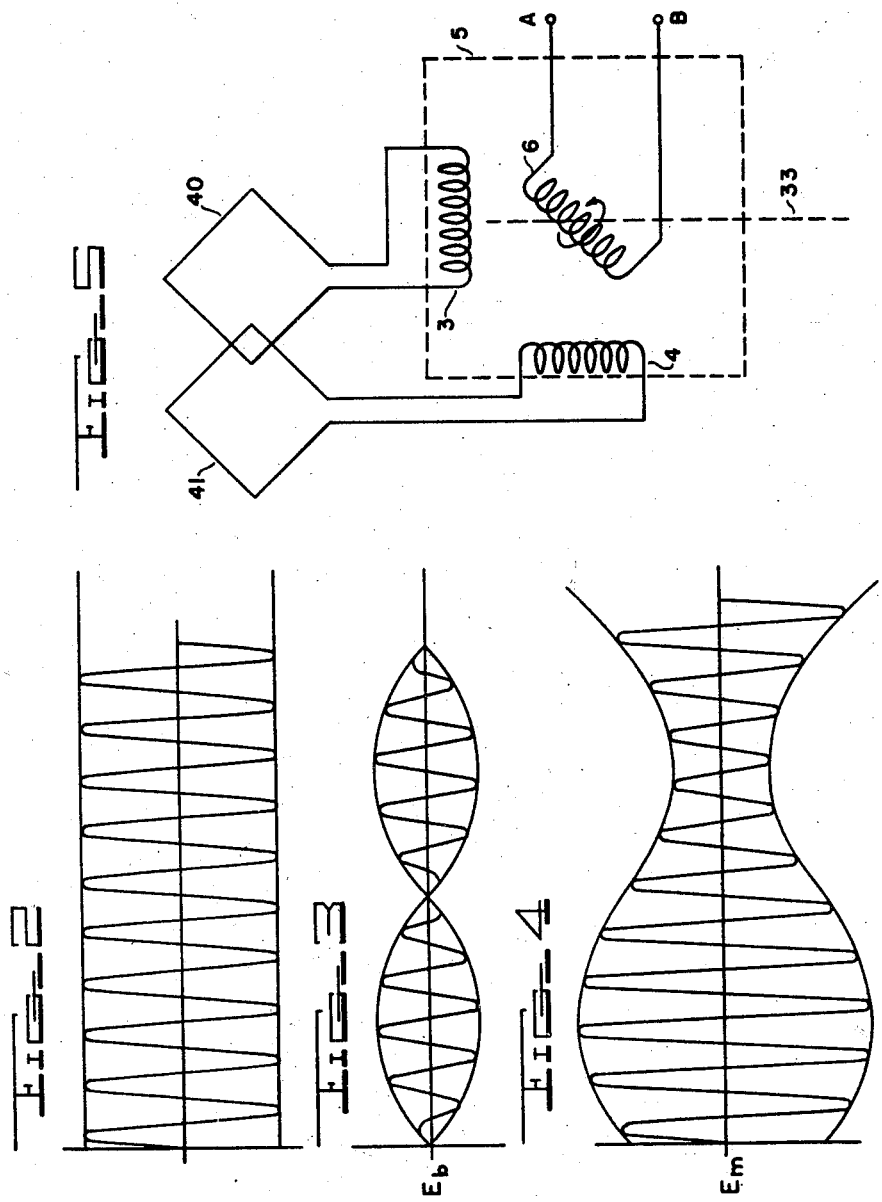
Inventor
MAXWELL K. GOLDSTEIN
By Ralph L. Chappell
Attorney Patented Nov. 2, 1948

2,452,564

UNITED STATES PATENT OFFICE 2,452,564

DIRECTION FINDER

Maxwell K. Goldstein, Washington, D. C.

Application May 15, 1945, Serial No. 593,900

2 Claims. (Cl. 343—117)

(Granted under the act of March 3, 1883, as amended April 30, 1928; 370 O. G. 757)

This invention relates to automatic direction finders, and is particularly directed to the problem of orienting a directivity characteristic of the antenna system with respect to an incoming signal.

Accordingly, an object of the invention is to provide means for orienting the sensitivity pattern of a directional antenna with respect to an incoming signal.

Another object of the invention is to provide a simple and effective system for causing the rotating coil of the goniometer of a direction finder to search rapidly for the minimum signal position and to home on that minimum, thus giving a rapid and automatic direct reading of the bearing of a signal from the direction finder.

A further object is to provide monitoring devices which will provide visual indication of whether the rotating coil of the goniometer is off course to the left or to the right of the direction of arrival of the incoming radio wave.

In the accompanying drawings:

Figure 1 is a diagrammatic representation of an automatic "hunting" type direction finder embodying the invention;

Figures 2 to 4 inclusive are diagrams of the wave forms of various voltages used in carrying out the invention; and Figure 5 is a schematic diagram of an alternative collector system for employment in the system of Figure 1.

Referring to Figure 1, it is seen that an arriving wave of electromagnetic energy will induce in antennas 1 and 2 voltages which are impressed upon fixed coils 3 and 4 respectively of radiogoniometer 5. A voltage is thus induced in movable coil 6 of the goniometer whose amplitude is dependent upon the position of the movable coil with respect to the fixed coils. When the cylindrical axis of the movable coil bears the same angular relation to the cross-sections of the fixed coils perpendicular to their cylindrical axes as the direction in azimuth of the incoming signal bears to the planes of the corresponding pairs of antennas, the voltage output of the goniometer will be zero. At this position of the movable, or search, coil it is said to be on course. When the search coil is off course, a voltage will be induced in it whose amplitude is proportional to the sine of the angle by which it is off course and whose phase is inverted whenever the search coil passes through the null or on course position.

To illustrate the operation of this invention, let Figure 2 represent the wave form of a voltage of frequency $f_r$ induced in search coil 6 when it is off course. This voltage is amplified in radio frequency amplifier 7, has its phase shifted 90° by phase shifter 8, and the resultant voltage $E_d$ is fed into balanced modulator 9. Balanced modulator 9 is controlled by an audio frequency voltage $E_a$ generated, for example, by an audio oscillator 10, and having a frequency $f_a$. The radio frequency voltage $E_d$ and audio frequency voltage $E_a$ are impressed on balanced modulator 9 to supply an output voltage $E_b$ having the wave form shown in Figure 3. The relative phase of the high and low frequency voltages shown in immaterial, and is merely exemplary in this figure. It will be noted that the radio frequency voltage has been modulated by the audio frequency voltage and that its phase shifts 180° at zero amplitude points.

Antenna 11 is a non-directional antenna whose output is fed into radio frequency amplifier 12, which may be simultaneously tuned with the radio frequency amplifier 7. Let $E_n$ be the voltage of frequency $f_r$ induced in the non-directional antenna 11 and amplified in radio frequency amplifier 12. As the voltage output of goniometer 5 is 90° out of phase with $E_n$, voltages $E_d$ and $E_n$ are either in phase or 180° out of phase, depending on the direction of the phase shift in phase shifter 8. Thus, voltage $E_b$ is in phase with $E_n$ in one loop and 180° out of phase in the next. It follows that when $E_b$ and $E_n$ are added together the resultant voltage $E_m$ will have the wave form shown in Figure 4.

The voltage $E_m$ is fed into a standard receiver 13 which may be simultaneously tuned with radio frequency amplifiers 7 and 12. The audio frequency output of the receiver may be passed through filter 15 which is tuned to reject frequency $f_a$, and then applied to loudspeaker 16 for aural reception of the incoming signal. The intermediate frequency output of the receiver is fed into the audio frequency filter 17 which is tuned for response to $f_a$. The voltage output $E_a'$ of filter 17, having frequency $f_a$, is used as described below to cause the search coil to home on the incoming signal, and also to operate monitoring devices which give indications as to whether the direction of the signal source is to the left or to the right of the direction in which the search coil is facing.

It will be noted that voltage $E_m$ is equivalent to the result which would be obtained if the incoming signal $E_n$ were amplitude modulated by a voltage of frequency $f_a$. The percentage of modulation of $E_m$ will be proportional to the maximum amplitude of the voltage $E_b$. But this depends on the amplitude of the voltage output of the search coil of the goniometer. Therefore, when the search coil is on course and its output is zero there will be no amplitude modulation of $E_n$ by $f_a$ and no output from audio filter 17.

On the other hand, whenever search coil 6 is off course voltage $E_a'$ of frequency $f_a$ will be applied to movable coil 18 of dynamometer 19. Voltage $E_a$ of frequency $f_a$ and of constant phase is continuously applied to the fixed coil 20 of the dynamometer. Voltage $E_a'$ is either in phase with $E_a$ or 180° out of phase with it depending on the phase of the envelope of $E_m$ with respect to $E_a$, which in turn depends on the phase of $E_d$ with respect to $E_n$. But this latter phase relation is determined ultimately by whether the direction of the received signal lies to the left or right of the direction in which the search coil is facing, for, as is pointed out above, the phase of the search coil voltage from which $E_d$ is derived inverts whenever the search coil passes through the null or on course position. Phase shifter 8 and coils 18 and 20 are so arranged that movable pointer 21 attached to coil 18 will indicate on scale 22 whether the search coil of the goniometer is off course to the left or to the right.

Another monitoring device, or left-right indicator, is provided by the use of cathode ray tube 23. The reference voltage $E_a$ is continuously applied to the vertical deflecting plates 24, resulting in a vertical line on screen 25 of the cathode ray tube when no voltage is applied to the horizontal deflecting plates 26. Whenever the goniometer search coil is off course, however, voltage $E_a'$ will be applied to the horizontal deflecting plates and the vertical line will be rotated on the screen. Voltage $E_a'$ is applied to that horizontal deflecting plate which will cause the rotation of the line to indicate whether the goniometer search coil is off course to the left or to the right.

Voltages $E_a$ and $E_a'$ are also used in this invention to achieve automatic, direct reading indication of the direction from which a signal is arriving. The reference voltage $E_a$ is continuously applied to coil 27 of two-phase induction motor 28. Whenever the goniometer search coil is off course, voltage $E_a'$ is fed through 90° phase shifter 29 to the other coil 30, of the two-phase induction motor. The resulting rotation of armature 31 is transmitted through an arrangement of gears 32 and shaft 33 to the search coil of the goniometer to cause it to rotate. It has been noted that the phase of voltage $E_a'$ is dependent on whether the search coil is off course to the left or right. Phase shifter 29 and coils 27 and 30 are so arranged that the phase relation of $E_a$ and $E_a'$ will cause the search coil to be rotated in the direction which will most quickly bring it on course. This arrangement provides continuous sense. When the search coil reaches the on course position, voltage $E_a'$ falls to zero and rotation of armature 31 ceases.

Radio compass 34 is connected to shaft 33 so that pointer 35 rotates in synchronism with the goniometer search coil and thus indicates automatically on scale 36 the bearing of the arriving wave with respect to the direction finder.

Figure 5 is a schematic diagram of an alternative collector system which can be employed with the system of Figure 1. The pairs of Adcock fixed antennas 1 and 2 of Figure 1 may be replaced with crossed loops 40 and 41 of Figure 5, and the voltage across terminals A, B of Figure 5 will be equivalent to the voltage across A, B in Figure 1.

It will be understood that the embodiment disclosed is exemplary of the invention, the scope whereof will be ascertained from the appended claims.

The invention described herein may be manufactured and used by or for the Government of the United States of America for governmental purposes without the payment of any royalties thereon or therefor.

What is claimed is:

1. A radio direction finder for determining the direction of a received signal comprising a directional antenna, directivity orientation control means therefor operative to invert the phase of the signal derived therefrom in dependency on the orientation of a directional characteristic with respect to an incoming signal, a non-directional antenna, oscillator means, means responsive to the oscillator means operative to recurrently invert the directional antenna signal phase, means for combining the non-directional antenna output with the recurrently inverted signal to thereby produce a resultant signal, a monitoring device having a pair of deflecting means operative to provide a visual indication of the relative phase and amplitudes of a pair of input signals applied thereto, means coupling the output of said oscillator to one of said deflecting means, means coupling said resultant signal to the other of said deflecting means whereby an instantaneous indication of the orientation of the directivity of the antenna means with respect to an incoming signal may be had, first power supply means responsive to the oscillator to supply an output voltage, second power supply means responsive to said resultant signal to supply an output voltage of a quadrature phase to the first power output voltage in dependency on the orientation of the directional characteristic with respect to an incoming signal, two phase motor means energized by the first and second power supply means, and means coupling the motor means to the directivity orientation control means operative to orient the directivity characteristic with respect to the incoming signal.

2. A radio direction finder for determining the direction of a received signal comprising a directional antenna, directivity orientation control means therefor operative to invert the phase of the signal derived therefrom in dependency on the orientation of the directional characteristic with respect to an incoming signal, a non-directional antenna, oscillator means, means responsive to the oscillator means operative to recurrently invert the directional antenna signal phase, means for combining the non-directional antenna output with the recurrently inverted signal to thereby produce a resultant signal, a cathode ray tube indicator having horizontal and vertical deflecting means, means coupling the output of said oscillator to one of said deflecting means, means coupling said resultant signal to the other of said deflecting means whereby an instantaneous indication of the orientation of the directivity of said antenna means with respect to an incoming signal may be had, first power supply means responsive to the oscillator to supply an output voltage, second power supply means responsive to said resultant signal to supply an output voltage of a quadrature phase to the first power output voltage in dependency on the orientation of the directional characteristic with respect to an incoming signal, two phase motor means energized by the first and second power supply means, and means coupling the motor means to the directivity orientation control means operative to orient the directivity characteristic with respect to the incoming signal.

MAXWELL K. GOLDSTEIN.

REFERENCES CITED

The following references are of record in the file of this patent:

UNITED STATES PATENTS

| Number | Name | Date |
|---|---|---|
| 2,028,856 | Woods | Jan. 28, 1936 |
| 2,314,029 | Bond | Mar. 13, 1943 |